(12) United States Patent
Jahn et al.

(10) Patent No.: US 11,888,423 B2
(45) Date of Patent: Jan. 30, 2024

(54) VOLTAGE MODULATION FOR CONTROLLING A MOTOR

(71) Applicant: Infineon Technologies AG, Neubiberg (DE)

(72) Inventors: Benjamin Jahn, Ilmenau (DE); Stanislav Gerber, Erfurt (DE); Bastian Schindler, Ilmenau (DE); Michael Brückner, Ilmenau (DE)

(73) Assignee: Infineon Technologies AG, Neubiberg (DE)

( * ) Notice: Subject to any disclaimer, the term of this patent is extended or adjusted under 35 U.S.C. 154(b) by 35 days.

(21) Appl. No.: 17/511,001

(22) Filed: Oct. 26, 2021

(65) Prior Publication Data

US 2023/0128670 A1 Apr. 27, 2023

(51) Int. Cl.
*H02P 27/08* (2006.01)
(52) U.S. Cl.
CPC .................. *H02P 27/085* (2013.01)
(58) Field of Classification Search
CPC .............. H02P 27/08; H02P 27/085
See application file for complete search history.

(56) References Cited

U.S. PATENT DOCUMENTS

| | | | |
|---|---|---|---|
| 2010/0194330 A1* | 8/2010 | Hayashi | H02P 27/08 318/799 |
| 2011/0037423 A1* | 2/2011 | Koda | H02P 6/15 318/400.37 |
| 2014/0062360 A1* | 3/2014 | Muramatsu | H02P 6/153 318/400.14 |
| 2014/0139153 A1* | 5/2014 | Aoki | H02P 6/153 318/400.1 |
| 2014/0176030 A1* | 6/2014 | Yamato | H02P 6/14 318/400.11 |
| 2020/0266732 A1* | 8/2020 | Kaidu | H02P 6/15 |

* cited by examiner

*Primary Examiner* — Rina I Duda
(74) *Attorney, Agent, or Firm* — Shumaker & Sieffert, P.A.

(57) ABSTRACT

A circuit for controlling a motor that includes control circuitry configured to generate, for a phase of the motor, a switching signal indicating to couple the phase to a first terminal of a supply for an entire portion of each switching cycle of a first plurality of switching cycles corresponding to a first range of electrical angles for the rotor and to couple the phase to a second terminal of the supply for a portion of each switching cycle of a second plurality of switching cycles corresponding to a second range of electrical angles for the rotor. The control circuitry is further configured to control the motor based on the switching signal.

21 Claims, 10 Drawing Sheets

VOLTAGE MODULATION FOR CONTROLLING A MOTOR

TECHNICAL FIELD

This disclosure relates to circuits and techniques for generating a switching signal, and more specifically, circuits and techniques for generating a switching signal associated with operating or controlling an electric motor.

BACKGROUND

Operation of a motor may be performed by a controller. The controller controls a rotor rotation of the motor based on a position of the rotor relative to stator coils of the motor. For example, the controller may control inverter circuitry to provide power from a voltage rail to each phase of the motor based on the rotor position to provide a desired rotor speed and/or torque.

SUMMARY

In general, this disclosure is directed to techniques for a generating a switching signal for controlling driver circuitry to provide a voltage, for example, for driving a motor (e.g., a three-phase electrical motor). For example, control circuitry may generate a switching signal to indicate to couple a phase to a terminal of a supply for an entire portion of each switching cycle of a first plurality of switching cycles corresponding to a first range (e.g., 60°) of electrical angles for a rotor of the motor.

In one example, this disclosure describes a circuit for controlling a motor, the circuit comprising control circuitry configured to generate, for a phase of the motor, a switching signal indicating to couple the phase to a first terminal of a supply for an entire portion of each switching cycle of a first plurality of switching cycles corresponding to a first range of electrical angles for the rotor and to couple the phase to a second terminal of the supply for a portion of each switching cycle of a second plurality of switching cycles corresponding to a second range of electrical angles for the rotor. The control circuitry is further configured to control the motor based on the switching signal.

In another example, this disclosure describes a method that comprises generating, with control circuitry, for a phase of the motor, a switching signal indicating to couple the phase to a first terminal of a supply for an entire portion of each switching cycle of a first plurality of switching cycles corresponding to a first range of electrical angles for the rotor and to couple the phase to a second terminal of the supply for a portion of each switching cycle of a second plurality of switching cycles corresponding to a second range of electrical angles for the rotor. The method further comprises controlling, with the control circuitry, the motor based on the switching signal.

In another example, this disclosure describes a system comprising a motor, driver circuitry configured to drive the motor based on a switching signal, and control circuitry. The control circuitry is configured to generate, for a phase of the motor, the switching signal to indicate to couple the phase to a first terminal of a supply for an entire portion of each switching cycle of a first plurality of switching cycles corresponding to a first range of electrical angles for the rotor and to couple the phase to a second terminal of the supply for a portion of each switching cycle of a second plurality of switching cycles corresponding to a second range of electrical angles for the rotor. The control circuitry is configured to output the switching signal.

Details of these and other examples are set forth in the accompanying drawings and the description below. Other features, objects, and advantages will be apparent from the description and drawings, and from the claims.

DETAILED DESCRIPTION

This disclosure is directed to circuits and techniques for a generating a switching signal for controlling a driver circuitry (e.g., inverter circuitry) to provide a voltage, for example, for driving a motor (e.g., a three-phase electrical motor). As described further herein, some switching signals may provide relatively low switching losses but low electro-magnetic compatibility. Moreover, switching signals with high electro-magnetic compatibility may have relatively high switching losses.

In accordance with the techniques of the disclosure, control circuitry may be configured to generate, for a phase of a motor, a switching signal indicating to couple the phase to a first terminal of a supply for an entire portion of each switching cycle of a first plurality of switching cycles corresponding to a first range of electrical angles for the rotor. For instance, the control circuitry may generate the switching signal to indicate to couple the phase to a positive terminal for the entire portion of each switching cycle for ⅙ (e.g., 60°) of a rotation cycle of the motor. In this way, the control circuitry may generate the switching signal to provide a relatively high electro-magnetic compatibility and relatively low switching losses (e.g., one-sixth switching loss reduction compared to third harmonic modulation (THM)). Generating a switching signal providing relatively low switching losses may help to provide one or more of a reduction in losses in operating the motor or a reduction in an amount of heat generated in operating the motor.

Figure 1:
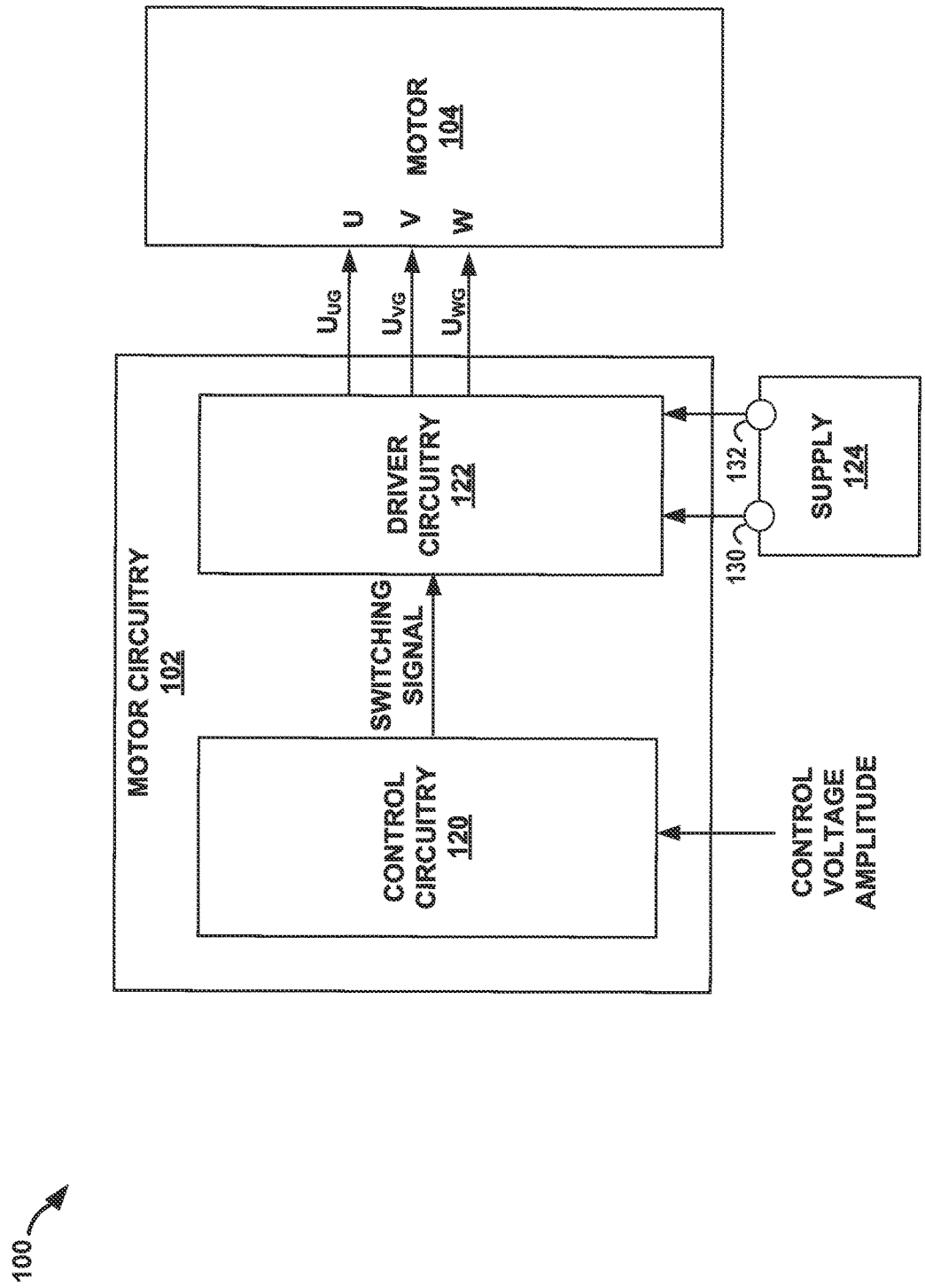
FIG. 1 is a block diagram illustrating an example system for controlling a motor, in accordance with one or more techniques of this disclosure.

FIG. 1 is a block diagram illustrating an example system 100 for controlling a motor 104, in accordance with one or more techniques of this disclosure. As illustrated in the example of FIG. 1, system 100 may include motor circuitry 102, supply 124, and motor 104. Motor circuitry 102 may include control circuitry 120 and driver circuitry 122. In some examples, however, driver circuitry 122 may be separate from motor circuitry 102.

Motor 104 may include, for example, a permanent magnet synchronous motor (PMSM), an externally excited motor, or an asynchronous motor. Motor 104 may operate as only a load to produce mechanical energy, only a generator to produce electrical energy, or both a motor and a generator. For example, a PMSM may include a shaft, rotor, stator, and permanent magnet. A permanent magnet may be mounted on or in the rotor. In some examples, the permanent magnet may be surface mounted to the rotor, inset in the rotor, or buried within the rotor. In some examples, the permanent magnet may be an interior magnet.

Supply 124 may be configured to provide, via driver circuitry 122, electrical power to one or more other components of system 100. As shown, supply 124 may comprise a first terminal 130 and a second terminal 132. In some examples, first terminal 130 of supply 124 may comprise a positive terminal and second terminal 132 of supply 124 may comprise a negative terminal. However, in some examples, first terminal 130 of supply 124 may comprise a negative terminal and second terminal 132 of supply 124 may comprise a positive terminal. As used herein, a negative terminal may refer to a ground terminal, a reference terminal, or a terminal configured to output a voltage below ground or below a reference node of motor circuitry 102. In some examples, supply 124 may be a battery which may be configured to store electrical energy.

Driver circuitry 122 may be configured to drive motor 104 based on the switching signal. For example, driver circuitry 122 may control one or more switching elements to provide a first phase voltage ($U_{UG}$), a second phase voltage ($U_{VG}$), and a third phase voltage ($U_{WG}$) to motor 104. In some examples, driver circuitry 122 may set each phase voltage to one of a first voltage output at first terminal 130 of supply 124 or a second voltage output at second terminal 132 of supply 124. Driver circuitry 122 may comprise multi-level drivers. For example, driver circuitry 122 may comprise a two-level inverter. In some examples, driver circuitry 122 may include a three-level inverter.

Control circuitry 120 may be configured to generate, for a phase (e.g., U, V, W) of motor 104, a switching signal and to control motor 104 based on the switching signal. For example, control circuitry 120 may output the switching signal to driver circuitry 122 to generate $V_{UG}$ at phase U of motor 104, $V_{VG}$ at phase V of motor 104, and $V_{WG}$ at phase W of motor 104. Control circuitry 120 may include one or more processors, such as one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry.

In accordance with the techniques of the disclosure, control circuitry 120 may generate, for a phase of motor 104, the switching signal to indicate to couple the phase to first terminal 130 of supply 124 for an entire portion of each switching cycle of a first plurality of switching cycles corresponding to a first range of electrical angles for the rotor. For instance, control circuitry 120 may generate, for phase U of motor 104, the switching signal indicating to couple phase U to first terminal 130 of supply 124 for an entire portion of each switching cycle of a first plurality of switching cycles corresponding to 150° to 210° range of electrical angles for the rotor of motor 104.

In this example, control circuitry 120 may generate, for a phase of motor 104, the switching signal to further indicate to couple the phase to second terminal 132 of supply 124 for a portion of each switching cycle of a second plurality of switching cycles corresponding to a second range of electrical angles for the rotor. For example, control circuitry 120 may generate, for phase U of motor 104, the switching signal to further indicate to couple phase U to second terminal 132 of supply 124 for a portion of each switching cycle of a second plurality of switching cycles corresponding to a −30° to 30°. Control circuitry 120 may be configured to modify the portion (e.g., duty cycle) based on a control voltage amplitude, for example, to control a speed and/or torque provided by motor 104.

Control circuitry 120 may be configured to control motor 104 based on the switching signal. For example, control circuitry 120 may be configured to output the switching signal to driver circuitry 122. In this example, driver circuitry 122 may be configured to drive motor 104 based on the switching signal. For example, driver circuitry 122 may control a half-bridge (e.g., of driver circuitry 122) for the phase based on the switching signal. In some examples, controller circuitry 120 may control a two-level inverter (e.g., of driver circuitry 122) for the phase based on the switching signal.

Figure 2:
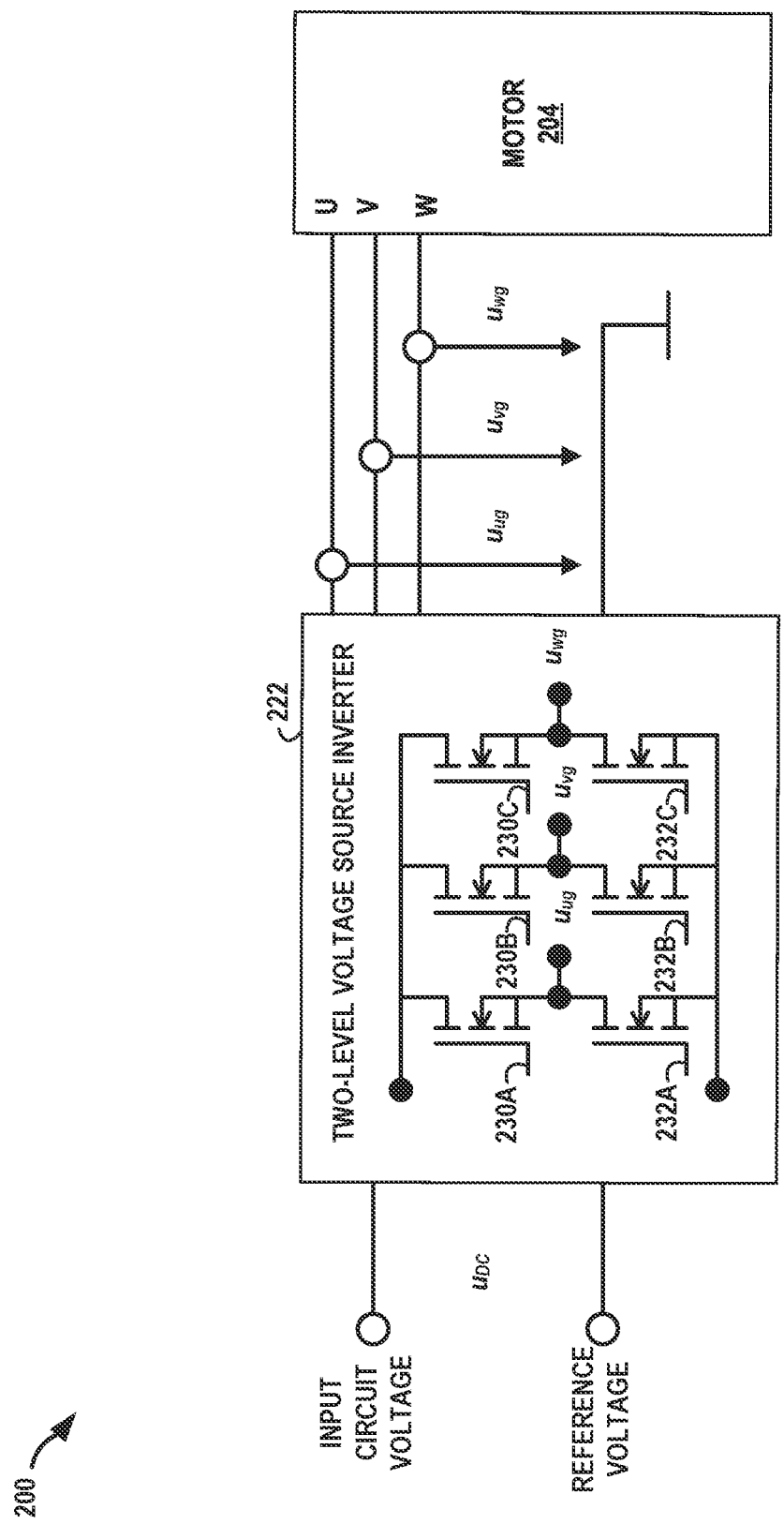
FIG. 2 is a conceptual diagram illustrating an example of a two-level voltage source inverter, in accordance with one or more techniques of this disclosure.

FIG. 2 is a conceptual diagram illustrating an example of a two-level voltage source inverter 222, in accordance with one or more techniques of this disclosure. System 200 may include two-level voltage source inverter and motor 204. Two-level voltage source inverter 222 may be an example of driver circuitry 122 and motor 204 may be an example of motor 104 of FIG. 1.

In the example of FIG. 2, two-level voltage source inverter 222 may either apply the reference voltage or input circuit voltage to the terminals (U, V, W) of motor 204. To scale the applied voltage, the terminals of motor 204 may be (by pulse width modulation or "PWM") between the input circuit voltage and the reference voltage with a high-frequency (e.g., 20 kHz or more). Control circuitry 120 may determine the toggle/switching timings (and therefore the mean applied voltage). Control circuitry 120 may drive switching elements 230A-230C, 232A-232C in two-level voltage source inverter 222 at the determined switching timings. Control circuitry 120 may apply field-oriented control (FOC) for a smooth motor operation.

For FOC of three-phase rotating electrical motors, a sinusoidal rotating magnetic field is established. Establishing the magnetic field may be achieved by applying mean terminal voltages using two-level voltage source inverter 222 to motor 104 such that the resulting phase voltages are sinusoidal. Thereby, the resulting star potential includes a degree of freedom for the choice of terminal voltages to be applied. However, all three terminal voltages may be kept within the limits given by the reference voltage and the input circuit voltage (e.g., the DC-link "$U_{DC}$") to be implementable by two-level voltage source inverter 222.

A technical problem to be solved, and possibly other problems, is the determination of terminal voltages ($u_{ug}$, $u_{vg}$, $u_{wg}$) (e.g., voltage modulation) for 3-phase electrical motors. Thereby, terminal voltages need to be such that difference voltages ($u_{ug}-u_{vg}$, $u_{vg}-u_{wg}$, $u_{wg}-u_{ug}$) are sinusoidal (e.g., a sinusoidal excitation of electrical motor). Some solutions include applying third harmonics modulation (THM), space vector modulation (SVM), bottom flat/top flat space vector modulation (BFSVM/TFSVM), discontinuous modulations (DM1/DM2). However, such solutions may not provide distinct advantages. Common aspects where these solutions differ from each other are given by: (1) a number of switching occurrences over a full electrical revolution; and (2) an electro-magnetic compatibility (EMC) due to the smoothness/continuity of the applied mean voltages.

The number of switching occurrences over a full electrical revolution stems from the fact, that for an efficient realization of the terminal voltages, switching two-level inverters may be used in almost all applications. However, techniques described herein may also be applied to multi-level inverter setups. Significant losses may occur during a transition/switch to a different voltage level. Therefore, designing a modulation scheme which keeps the voltage level constant at the reference voltage or the input circuit voltage for a significant part of one electrical revolution (e.g. reducing the necessary switch occurrences) is beneficial in terms of switching loss reduction.

Figure 3A:
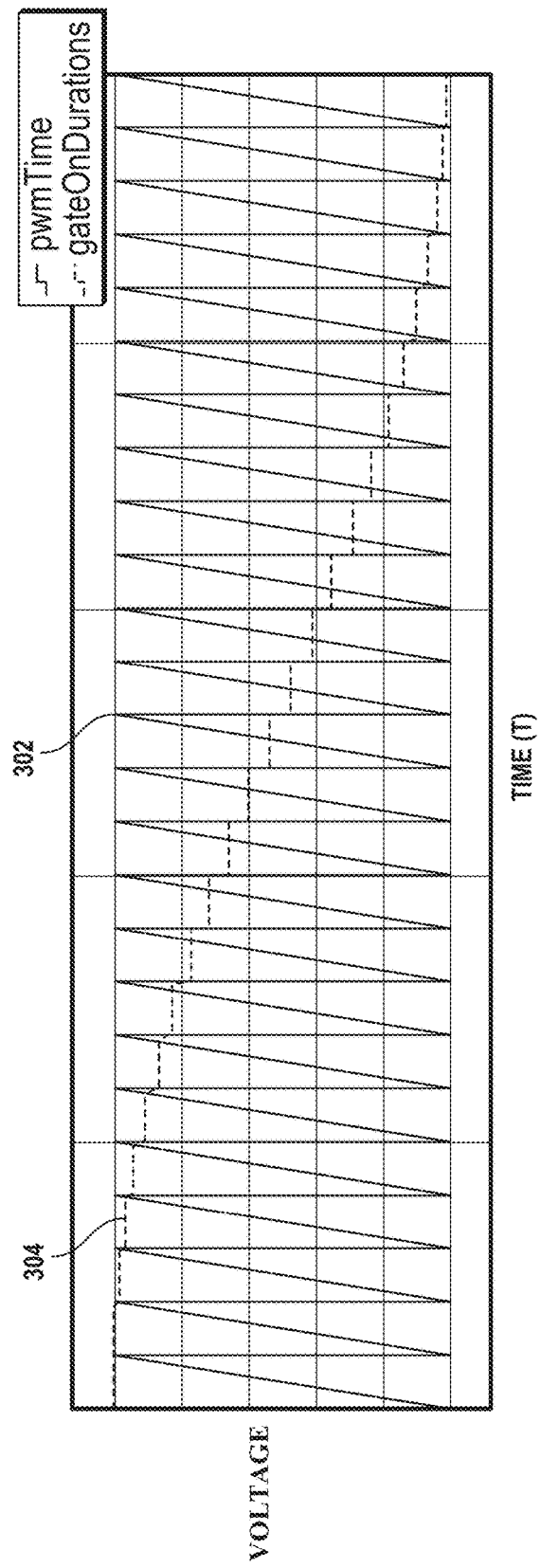
FIG. 3A is conceptual graph illustrating an example gate on signal, in accordance with one or more techniques of this disclosure.

FIG. 3A is conceptual graph illustrating an example gate on signal 304, in accordance with one or more techniques of this disclosure. The abscissa axis of FIG. 3A represents time (t) and the ordinate axis of FIG. 3A represents a PWM signal 302 and a gate on signal 304. FIG. 3A is described with FIGS. 1 and 2 for example purposes only.

In order to scale the applied voltage, motor circuitry 102 may toggle the terminals (e.g., using pulse width modulation or "PWM") between two levels (e.g., the input circuit voltage and the reference voltage) with a high-frequency (e.g., 20 kHz or more). Control circuitry 120 may determine the toggle/switching timings (e.g., and the mean applied voltage). Control circuitry 120 may apply FOC for smooth motor operation.

Figure 3B:
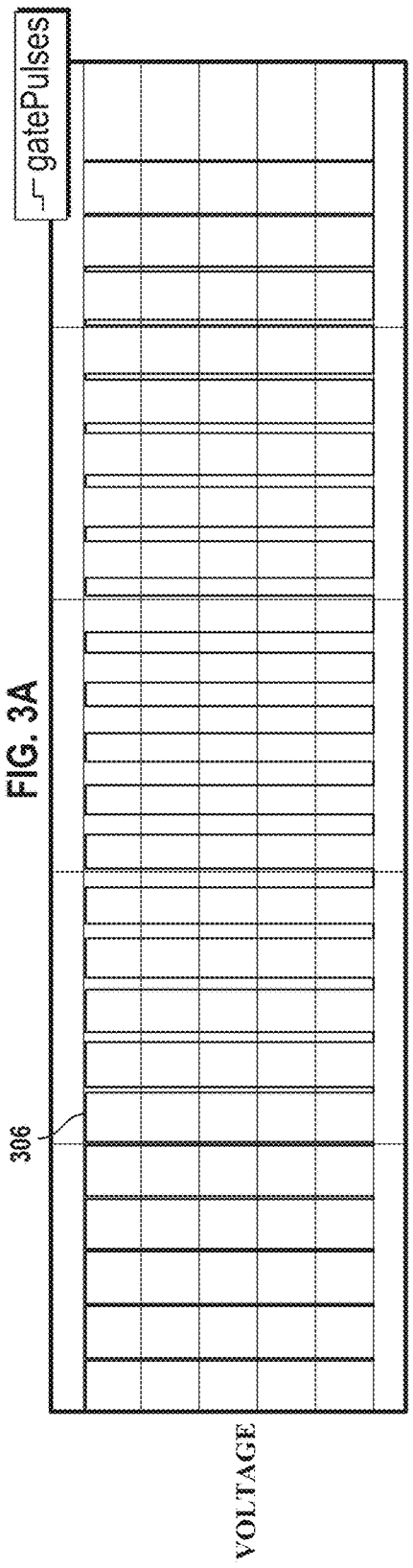
FIG. 3B is conceptual graph illustrating an example gate pulse signal for the gate on signal of FIG. 3A, in accordance with one or more techniques of this disclosure.

FIG. 3B is conceptual graph illustrating an example gate pulse signal 306 for gate on signal 304 of FIG. 3A, in accordance with one or more techniques of this disclosure. The abscissa axis of FIG. 3B represents time (t) and the ordinate axis of FIG. 3B represents gate pulse signal 306. FIG. 3B is described with FIGS. 1 and 2 for example purposes only. In this example, control circuitry 120 may control driver circuitry 122 based on gate pulse signal 306.

Figure 4:
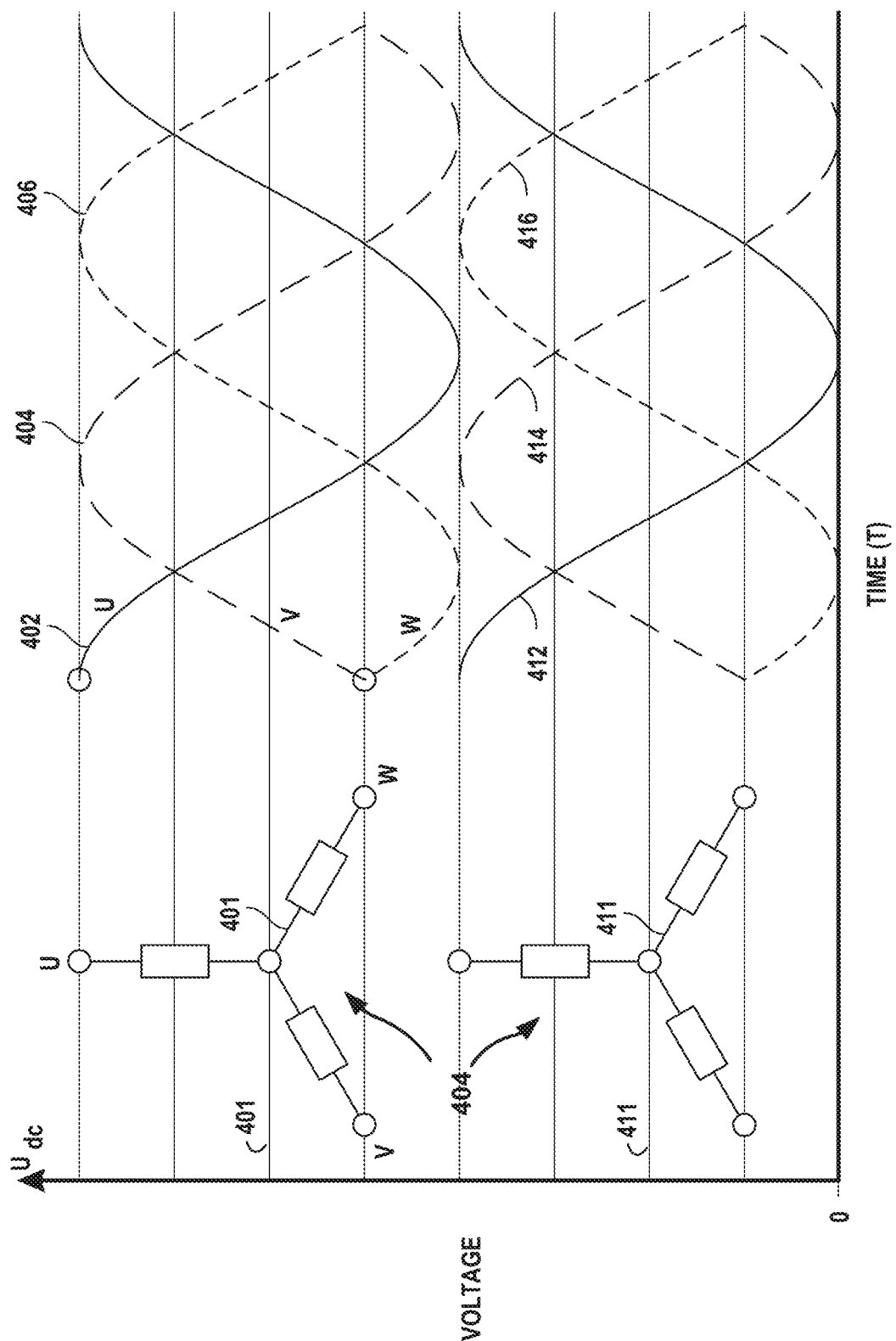
FIG. 4 is a conceptual graph illustrating an example range of star potentials for a motor, in accordance with one or more techniques of this disclosure.

FIG. 4 is a conceptual graph illustrating an example range of star potentials for a motor 404, in accordance with one or more techniques of this disclosure. The abscissa axis of FIG. 4 represents time (t) and the ordinate axis of FIG. 4 represents a first phase voltage 402, a second phase voltage 404, a third phase voltage 406 for motor 404 at a first star potential 401 and a first phase voltage 412, a second phase voltage 414, a third phase voltage 416 for motor 404 at a second star potential 411. FIG. 4 is described with FIGS. 1, 2, 3A, and 3B for example purposes only.

Motor circuitry 102 may establish a sinusoidal rotating magnetic field for FOC of three-phase rotating electrical motors. For example, control circuitry 120 may apply mean terminal voltages using driver circuitry 120 (e.g., a voltage source inverter) to motor 104 such that the resulting phase voltages are sinusoidal. For instance, in this example, control circuitry 120 may apply mean terminal voltages using driver circuitry 120 to motor 404 such that the resulting phase voltages comprise first phase voltage 402, second phase voltage 404, and third phase voltage 406.

Moreover, motor circuitry 102 may place the star potential arbitrarily to provide one degree of freedom as control. For example, control circuitry 120 may move the star potential (e.g., the node coupled to the U, V, and W phases of motor 404) from first star potential 401 to second star potential 411 (and various positions between and/or outside of first star potential 401 to second star potential 411). Control circuitry 120 may select the star potential such that all three terminal voltages (e.g., $V_{VG}$ at phase U, $V_{VG}$ at phase V, and $V_{WG}$ at phase W) are within the limit determine by the reference voltage (e.g., 0) and the DC link voltage (e.g., $U_{dc}$).

Figure 5:
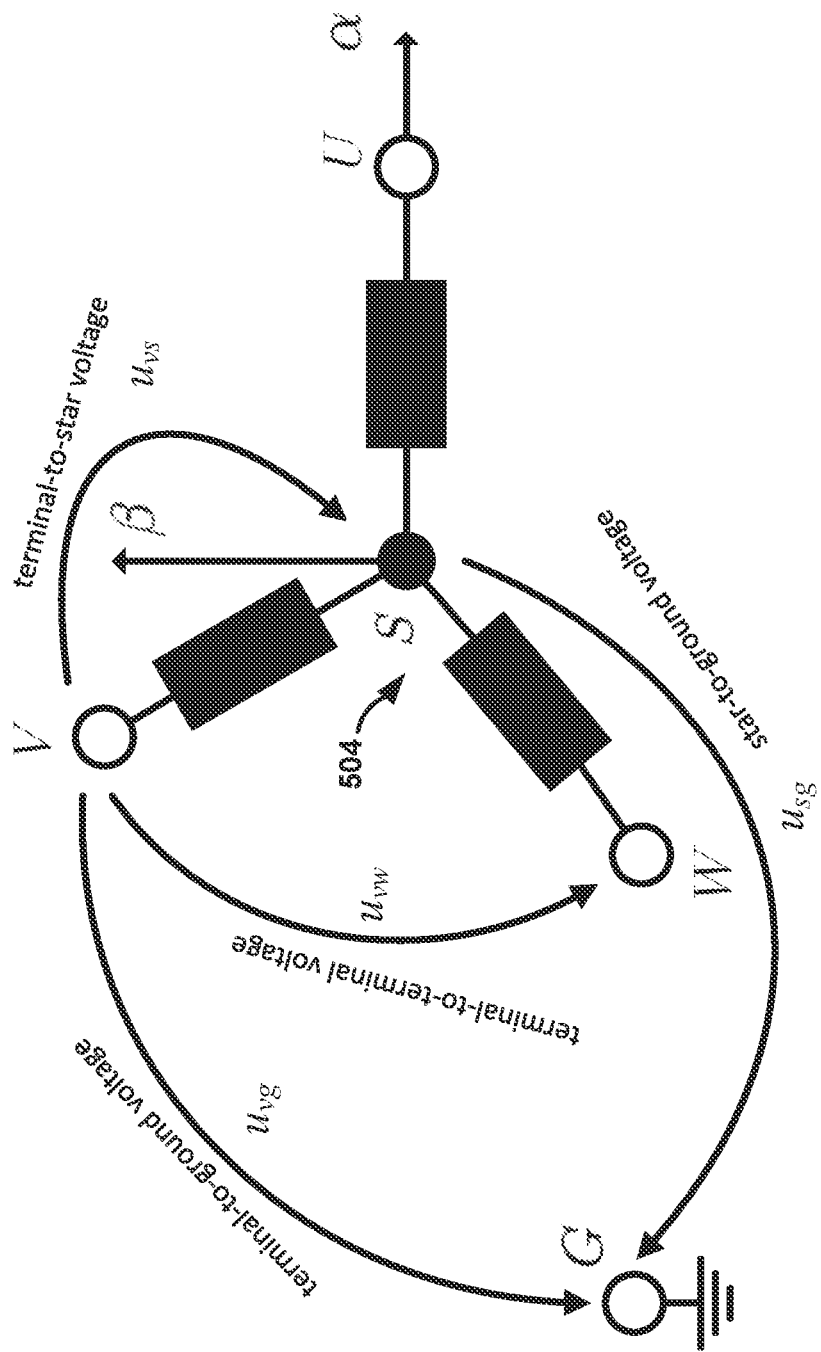
FIG. 5 is a conceptual graph illustrating an example motor, in accordance with one or more techniques of this disclosure.

FIG. 5 is a conceptual graph illustrating an example motor 504, in accordance with one or more techniques of this disclosure. FIG. 5 is described with FIGS. 1, 2, 3A, 3B, and 4 for example purposes only. As shown, FIG. 5 illustrates a star-to-ground voltage $u_{sg}$, which determines at which "height" motor 504 is floating. However, this "height" has no influence on the behavior of motor 504 as only the difference voltages (e.g., $U_{vs}$ at phase U) influence the motor behavior.

Translation of terminal-to-ground voltages (e.g., $u_{ug}$, $u_{vg}$, $u_{wg}$) to phase voltages (e.g., $u_\alpha$, $u_\beta$, $u_{sg}$) represented in two-dimensional stator frame may be calculated using equation 1.

$$\begin{bmatrix} u_\alpha \\ u_\beta \\ u_{sg} \end{bmatrix} = \frac{2}{3} \begin{bmatrix} 1 & -\frac{1}{2} & -\frac{1}{2} \\ 0 & \frac{\sqrt{3}}{2} & -\frac{\sqrt{3}}{2} \\ \frac{1}{2} & \frac{1}{2} & \frac{1}{2} \end{bmatrix} \begin{bmatrix} u_{ug} \\ u_{vg} \\ u_{wg} \end{bmatrix} \quad \text{EQUATION 1}$$

Figure 6A:
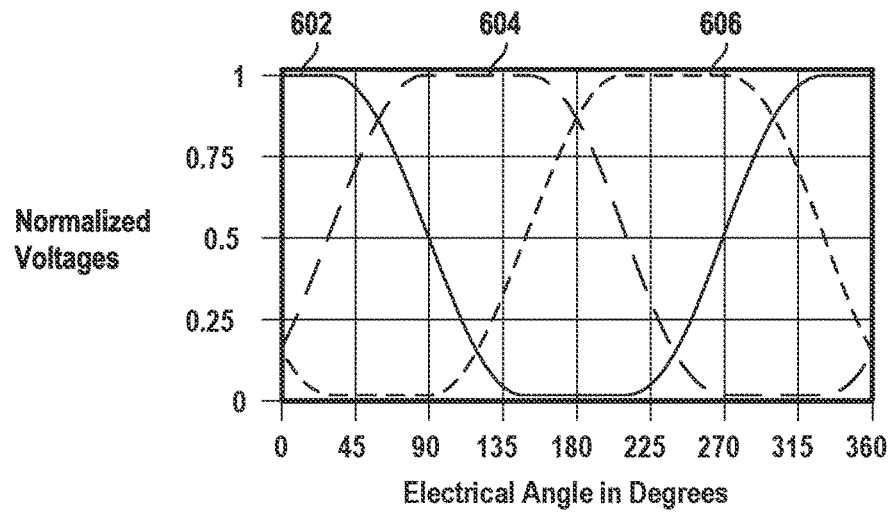
FIGS. 6A, 6B, 6C are conceptual graphs illustrating example switching cycles, in accordance with one or more techniques of this disclosure.
Figure 6B:
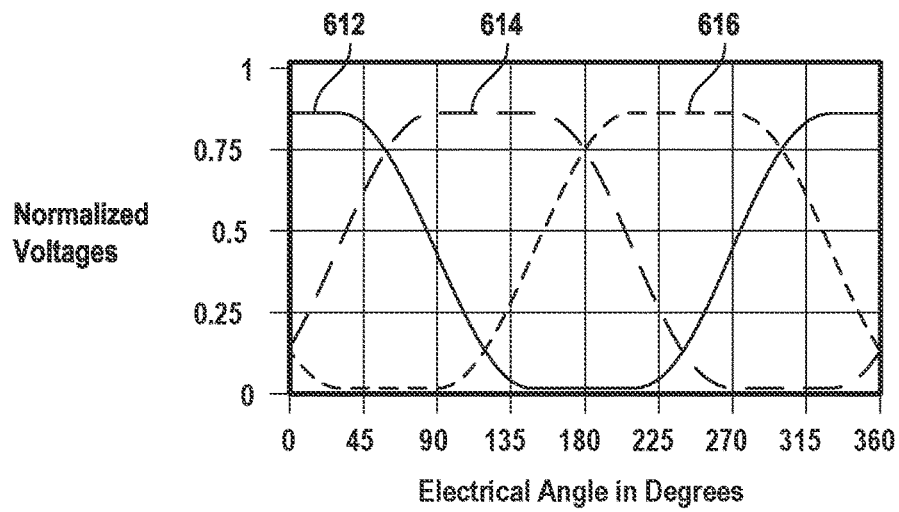
Figure 6C:
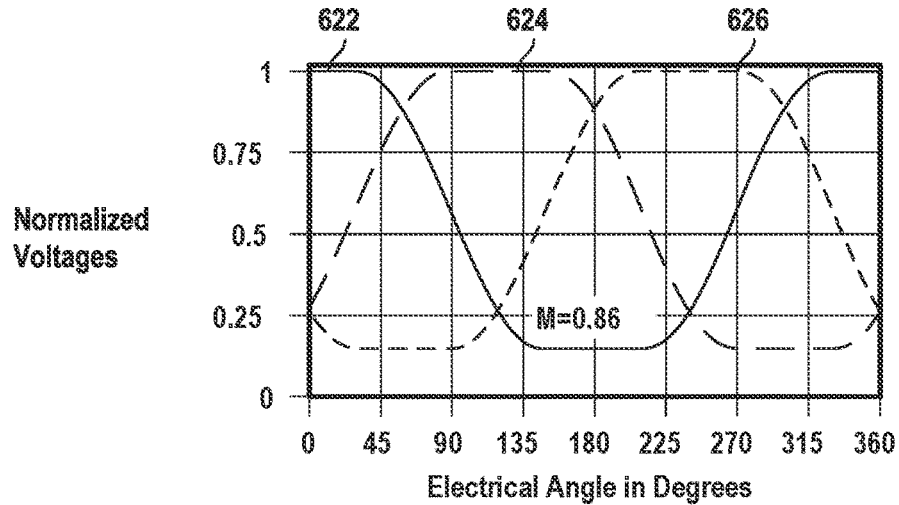

FIGS. 6A, 6B, 6C are conceptual graphs illustrating example switching signals, in accordance with one or more techniques of this disclosure. The abscissa axis of FIG. 6A represents an electrical angle in degrees of motor 104 and the ordinate axis of FIG. 6A represents a first switching signal 602, a second switching signal 604, a third switching signal 606 for motor 104 for a first control voltage amplitude. The abscissa axis of FIG. 6B represents an electrical angle in degrees of motor 104 and the ordinate axis of FIG. 6B represents a first switching signal 612, a second switching signal 614, a third switching signal 616 for motor 104 for a second control voltage amplitude. The abscissa axis of FIG. 6C represents an electrical angle in degrees of motor 104 and the ordinate axis of FIG. 6C represents a first switching signal 622, a second switching signal 624, a third switching signal 626 for motor 104 for the second control voltage amplitude. FIGS. 6A, 6B, and 6C are described with FIGS. 1, 2, 3A, 3B, 4, and 5 for example purposes only. Control circuitry 120 (or other circuitry) may determine the control voltage amplitude based on rotor speed of motor 104.

In the example of FIG. 6A, first switching signal 602 indicates to couple phase U of motor 104 to first terminal 130 of supply 124 for an entire portion of each switching cycle of a first plurality of switching cycles corresponding to a first range of electrical angles for the rotor (e.g., 150°-210°). In this example, first switching signal 602 indicates to couple phase U of motor 104 to second terminal 132 of supply 124 for a portion of each switching cycle of a second plurality of switching cycles corresponding to a second range of electrical angles for the rotor (e.g., −30°-30°).

In the example of FIG. 6A, control circuitry 120 may apply the terminal voltages of equation 2 over an electrical revolution. Equation 2 may represent an explicit mathematical formula of the voltage applied to the first terminal.

$$u_u(\varphi) = \begin{cases} M & , -30° \le \varphi < 30° \\ M\cos(\varphi - 30°) & , 30° \le \varphi < 90° \\ M(1 + \cos(\varphi + 30°)) & , 90° \le \varphi < 150° \\ 0 & , 150° \le \varphi < 210° \\ M(1 + \cos(\varphi - 30°)) & , 210° \le \varphi < 270° \\ M\cos(\varphi + 30°) & , 270° \le \varphi < 330° \end{cases} \quad \text{EQUATION 2}$$

The amplitude of the shape of equation 2 is determined by the voltage amplitude requested and can be modulated by the modulation index M (e.g., 1 in FIG. 6A). Applying all three terminal voltages results in a sinusoidal motor excitation. Voltages for the other terminals (e.g., phases V and W) are then simply shifted by 120° and 240°.

For example, control circuitry 120 may, when applying equation 2, generate first switching signal 602 to indicating to couple the phase to first terminal (e.g., a reference voltage) for the entire first range of electrical angles that comprises 150°-210°, which may provide a reduction of the switching occurrences by ⅙ (e.g., much fewer switching losses) compared to systems that switch during the first range of electrical angles.

In the example of FIG. 6A, first switching signal 602 indicates to couple phase U of motor 104 to second terminal 132 for a full portion (e.g., a duty cycle of 100%) of each switching cycle of the second plurality of switching cycles corresponding to a second range of electrical angles for the rotor (e.g., −30°-30°). Control circuitry 120 may be configured to couple phase U of motor 104 for a partial portion of each switching cycle of the second plurality of switching cycles as shown in FIG. 6B.

In the example of FIG. 6B and similar to FIG. 6A, first switching signal 612 indicates to couple phase U of motor 104 to first terminal 130 (e.g., a reference voltage) of supply 124 for an entire portion of each switching cycle of a first plurality of switching cycles corresponding to a first range of electrical angles for the rotor (e.g., 150°-210°). However, in the example of FIG. 6B, first switching signal 612 indicates to couple phase U of motor 104 to second terminal 132 (e.g., an input circuit voltage) of supply 124 for a portion (e.g., corresponding to a modulation index of 0.86) of each switching cycle of a second plurality of switching cycles corresponding to a second range of electrical angles for the rotor (e.g., −30°-30°). A modulation index may refer to a portion of a full voltage provided by supply 124. For instance, a modulation index of 1 may refer to 100% of a normalized amplitude voltage provided by supply 124.

Control circuitry 120 may generate the switching signal to control driver circuitry 122 to modulate a duty cycle for coupling the phase to first terminal 130 of supply 124 for a third plurality of switching cycles corresponding to a third range (e.g., 30°-90°) of electrical angles for the rotor such that a voltage at the phase matches a first set of cosine functions during the third range of electrical angles for the rotor. In this example, the switching signal is configured to control driver circuitry 122 to modulate a duty cycle for coupling the phase to second terminal 132 of supply 124 for a fourth plurality of switching cycles corresponding to a fourth range (e.g., 210°-330°) of electrical angles for the rotor such that a voltage at the phase matches a second set of cosine functions during the fourth range of electrical angles for the rotor.

For instance, the first set of cosine functions may comprise $M*\cos(\phi-30°)$ for an electrical angle for the rotor within 30° to 90° and $M*(1+\cos(\phi+30°))$ for the electrical angle for the rotor within 90° to 150°, wherein M is a voltage between first terminal 130 and second terminal 132, and $\phi$ is the electrical angle for the rotor. In some instances, the second set of cosine functions may comprise $M*(1+\cos(\phi-30°))$ for the electrical angle for the rotor within 210° to 270° and $M*\cos(\phi+30°)$ for the electrical angle for the rotor within 270° to 330°.

Control circuitry 120 may generate the switching signal to control driver circuitry 122 to modulate a duty cycle for coupling the phase to first terminal 130 of supply 124 for a third plurality of switching cycles corresponding to a third range (e.g., 30°-150°) of electrical angles for the rotor such that a voltage at the phase matches a first set of cosine functions during the third range of electrical angles for the rotor. In this example, the switching signal is configured to control driver circuitry 122 to modulate a duty cycle for coupling the phase to second terminal 132 of supply 124 for a fourth plurality of switching cycles corresponding to a fourth range (e.g., 210°-330°) of electrical angles for the rotor such that a voltage at the phase matches a second set of cosine functions during the fourth range of electrical angles for the rotor.

For instance, the first set of cosine functions may comprise $M*\cos(\phi-30°)$ for an electrical angle for the rotor within 30° to 90° and $M*(1+\cos(\phi+30°))$ for the electrical angle for the rotor within 90° to 150°, wherein M is a voltage between first terminal 130 and second terminal 132, and is the electrical angle for the rotor. In some instances, the second set of cosine functions may comprise $M*(1+\cos(\phi-30°))$ for the electrical angle for the rotor within 210° to 270° and $M*\cos(\phi+30°)$ for the electrical angle for the rotor within 270° to 330°.

Another variant is to fix the modulation pattern at the supply voltage (e.g., upper level) and to reduce switching losses in the same way as the top half-bridge switch is kept on (while the bottom half-bridge switch is kept off). The example that varies the modulation pattern for the reference voltage is as shown in equation 3.

$$u_u(\varphi) = \begin{cases} 1 & , -30° \le \varphi < 30° \\ (1-M)\cos(\varphi - 30°) + M & , 30° \le \varphi < 90° \\ (1-M)(1 + \cos(\varphi + 30°)) + M & , 90° \le \varphi < 150° \\ M & , 150° \le \varphi < 210° \\ (1-M)(1 + \cos(\varphi - 30°)) + M & , 210° \le \varphi < 270° \\ (1-M)\cos(\varphi + 30°) + M & , 270° \le \varphi < 330° \end{cases} \quad \text{EQUATION 3}$$

Thus, in some examples, control circuitry 120 may generate, for a phase of motor 104, a switching signal ($u_u(\varphi)$) indicating to couple the phase to first terminal 130 (e.g., an input circuit voltage) of supply 124 for an entire portion of each switching cycle of a first plurality of switching cycles corresponding to a first range of electrical angles (e.g., −30°-30°) for the rotor and to couple the phase to second terminal 132 (e.g., a reference voltage) of supply 124 for a portion (e.g., corresponding to a duty cycle of 86%) of each switching cycle of a second plurality of switching cycles corresponding to a second range (e.g., 150°-210°) of electrical angles for the rotor.

Control circuitry 120 may generate the switching signal to control driver circuitry 122 to modulate a duty cycle for coupling the phase to first terminal 130 of supply 124 for a third plurality of switching cycles corresponding to a third range (e.g., 30°-150°) of electrical angles for the rotor such that a voltage at the phase matches a first set of cosine functions during the third range of electrical angles for the rotor. In this example, the switching signal is configured to control driver circuitry 122 to modulate a duty cycle for coupling the phase to second terminal 132 of supply 124 for a fourth plurality of switching cycles corresponding to a fourth range (e.g., 210°-330°) of electrical angles for the rotor such that a voltage at the phase matches a second set of cosine functions during the fourth range of electrical angles for the rotor.

For instance, the first set of cosine functions may comprises $(1-M)*\cos(\phi-30°)+M$ for an electrical angle for the rotor within 30° to 90° and $(1-M)*(1+\cos(\phi+30°))+M$ for the electrical angle for the rotor within 90° to 150°, wherein M is a voltage between first terminal 130 and second terminal 132, and $\phi$ is the electrical angle for the rotor. In some instances, the second set of cosine functions may comprise $(1-M)*(1+\cos(\phi-30°))+M$ for the electrical angle for the rotor within 210' to 270° and $(1-M)*\cos(\phi+30°)+M$ for the electrical angle for the rotor within 270° to 330°.

In the example of FIG. 6C and similar to FIG. 6A, first switching signal 622 indicates to couple phase U of motor 104 to first terminal 130 (e.g., an input circuit voltage) of supply 124 for an entire portion of each switching cycle of a first plurality of switching cycles corresponding to a first range of electrical angles for the rotor (e.g., −30°-30°). However, in the example of FIG. 6C, first switching signal 612 indicates to couple phase U of motor 104 to second terminal 132 (e.g., a reference voltage) of supply 124 for a portion (e.g., corresponding to a modulation index of 0.86) of each switching cycle of a second plurality of switching cycles corresponding to a second range of electrical angles for the rotor (e.g., 150°-210°).

In the example of FIG. 6A first switching signal 602 may indicate to couple the phase to first terminal 130 (e.g., a reference voltage) for the entire first range of electrical angles that comprises 150°-210° and to couple the phase to second terminal (e.g., an input circuit voltage) for the entire first range of electrical angles that comprises −30°-30°, which may provide a reduction of the switching occurrences by ⅓ (e.g., much fewer switching losses) compared to systems that switch during the first range of electrical angles. In the example of FIG. 6B, first switching signal 612 indicates to couple the phase to first terminal (e.g., a reference voltage) for the entire first range of electrical angles that comprises 150°-210°, which may provide a reduction of the switching occurrences by ⅙ (e.g., much fewer switching losses) compared to systems that switch during the first range of electrical angles. For FIG. 6C, first switching signal 622 indicates to couple the phase to first terminal (e.g., an input circuit voltage) for the entire first range of electrical angles that comprises 30°-30°, which may provide a reduction of the switching occurrences by ⅙ (e.g., much fewer switching losses) compared to systems that switch during the first range of electrical angles.

Figure 7:
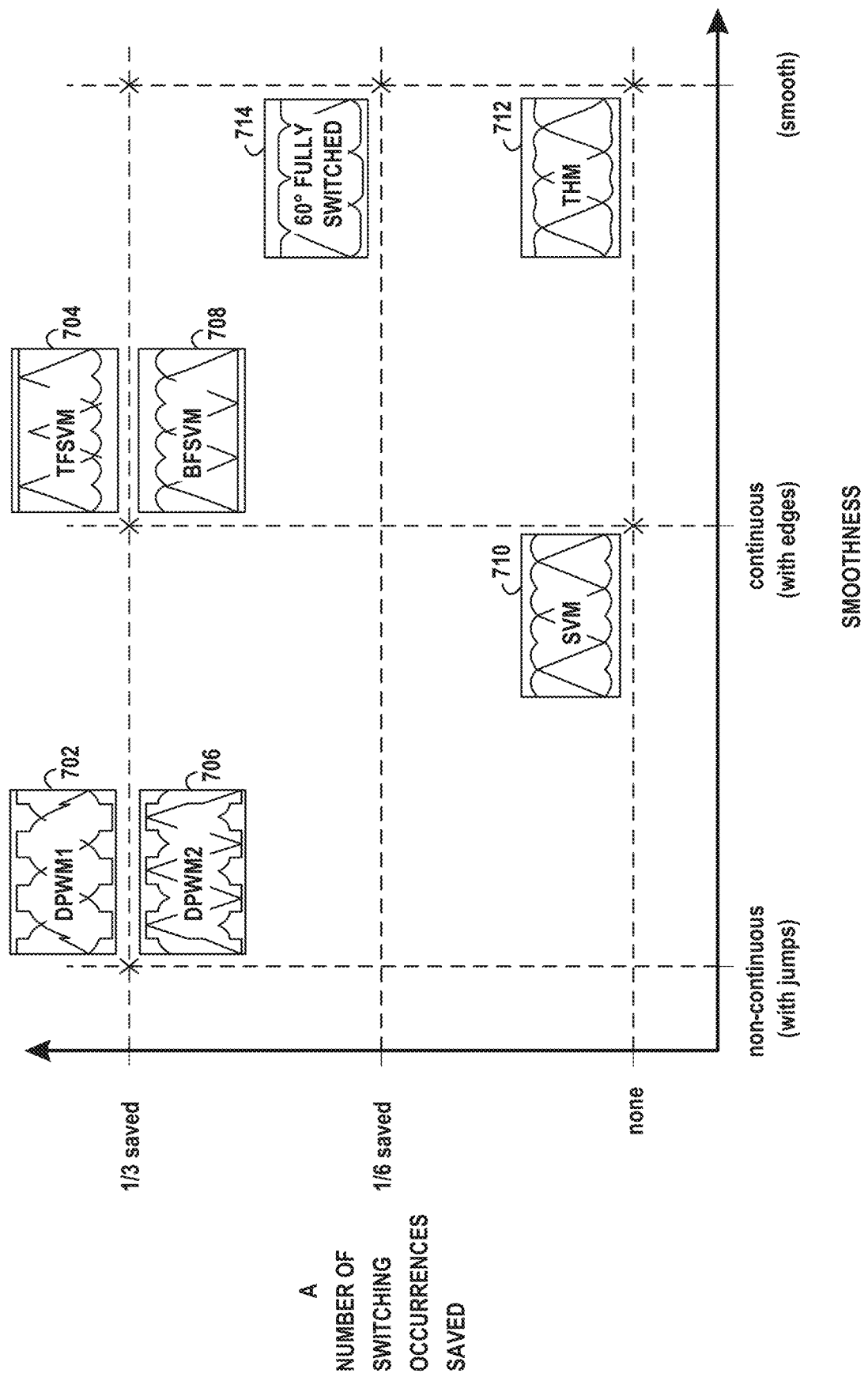
FIG. 7 is a conceptual graph illustrating modulation schemes, in accordance with one or more techniques of this disclosure.

FIG. 7 is a conceptual graph illustrating modulation schemes, in accordance with one or more techniques of this disclosure. The abscissa axis of FIG. 7 represents smoothness and the ordinate axis of FIG. 7 represents a number of switching occurrences saved. FIG. 7 is described with FIGS. 1, 2, 3A, 3B, 4, 5, and 6A, 6B, and 6C for example purposes only.

Third Harmonics Modulation (THM) 712 may be the most advantageous in terms of EMC as the applied terminal voltages are smooth. However, THM 712 may provide no reduction in switching occurrences which results in full switching losses. Space vector modulation (SVM) 710 may offer no reduction in switching occurrences with a reduced EMC characteristic compared to THM 712. Discontinuous modulations, which includes DPWM1 702 and DPWM2 706, may provide a reduction of the switching occurrences by ⅓ (e.g., much fewer switching losses) while introducing jumps in the applied terminal voltages (e.g., less EMC due to emissions). This may be improved by bottom flat vector modulation (BFSVM) 708 and/or top flat space vector modulation (TFSVM) 704 as the voltage jumps can be avoided while still reducing the number of switching occurrences by ⅓ (e.g., applied voltages still have sharp edges). However, DPWM1 702, TFSVM 704, DPWM2 706, BFSVM 708, SVM 710, and THM 712 may fail to provide smooth terminal voltages to be applied while avoiding at least some switching occurrences.

In the techniques described herein for 60° fully switched modulation 714, the voltages may only change smoothly over a full revolution without any edges or jumps. This may correspond with a better electro-magnetic compatibility (EMC) as no additional emissions at the frequency of the electrical rotation are introduced (emissions due to PWM-based voltage generation are much higher in frequency, typically 20 kHz or more). Furthermore, switching occurrences may be reduced by ⅙ as each terminal is kept at zero for ⅙ of a full revolution. Comparing all mentioned modulation techniques in FIG. 7 shows that 60° fully switched modulation 714 may be based on smooth terminal voltages to be applied to the electrical motor while reducing the number of switching occurrences by ⅙. Therefore, 60° fully switched modulation 714 may help to provide a solution which has been missing before for the trade-off balancing.

Figure 8:
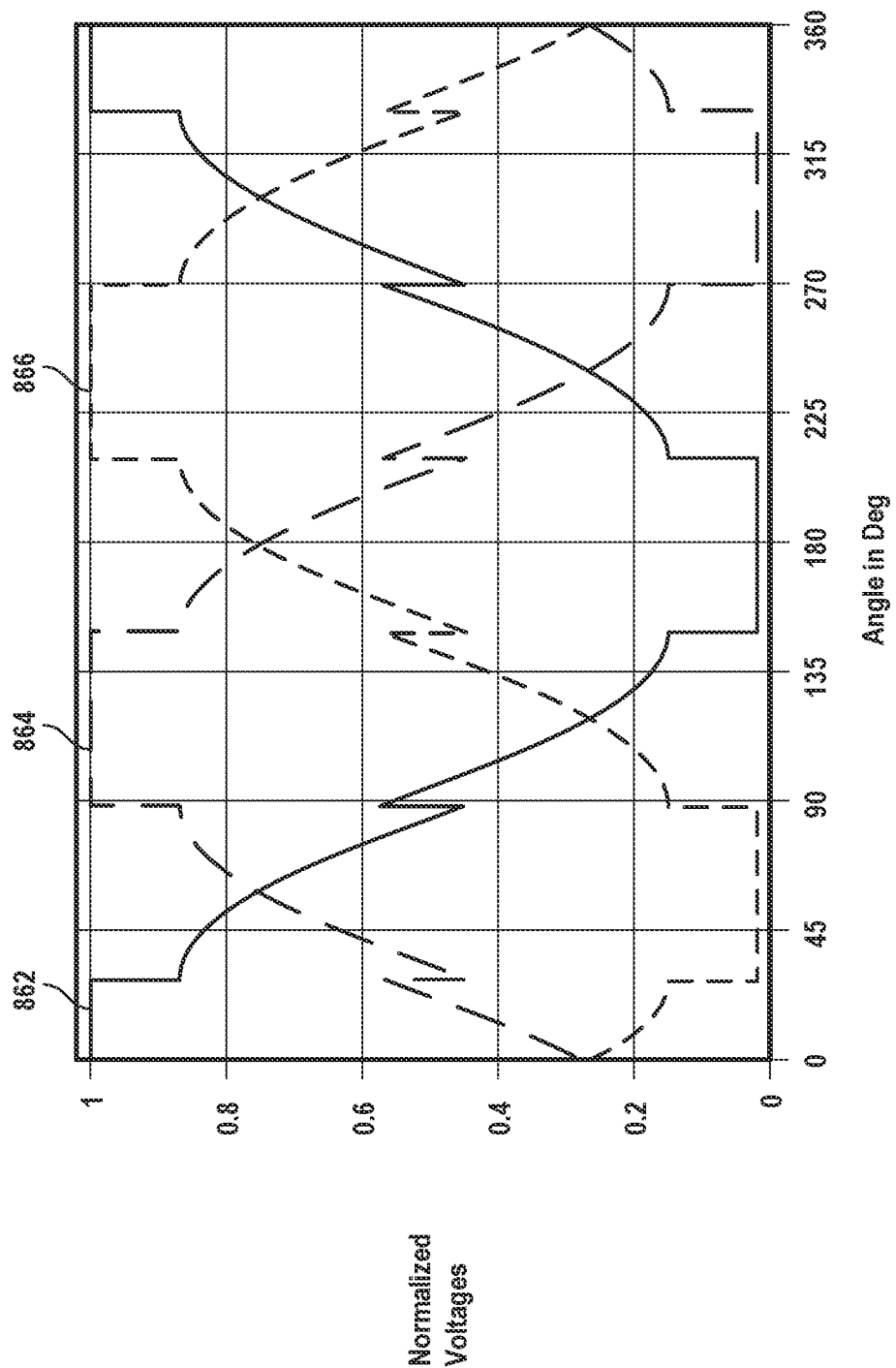
FIG. 8 is a conceptual graph illustrating an example of a non-continuous switching cycle, in accordance with one or more techniques of this disclosure.

FIG. 8 is a conceptual graph illustrating an example of a non-continuous switching cycle, in accordance with one or more techniques of this disclosure. The abscissa axis of FIG. 8 represents an electrical angle in degrees of motor 104 and the ordinate axis of FIG. 8 represents a first switching signal 862, a second switching signal 864, a third switching signal 866 for motor 104. FIG. 8 is described with FIGS. 1, 2, 3A, 3B, 4, 5, and 6A, 6B, 6C, and 7 for example purposes only.

While DPWM1 may provide a relatively high number of switching occurrences saved compared to 60° fully switched modulation 714 and a comparable smoothness in a case of full voltage requested (e.g., a limited case). However, as shown, when modulated, DPWM1 provides a non-continuous switching cycle, which may result in less EMC due compared to 60° fully switched modulation 714.

Figure 9C:
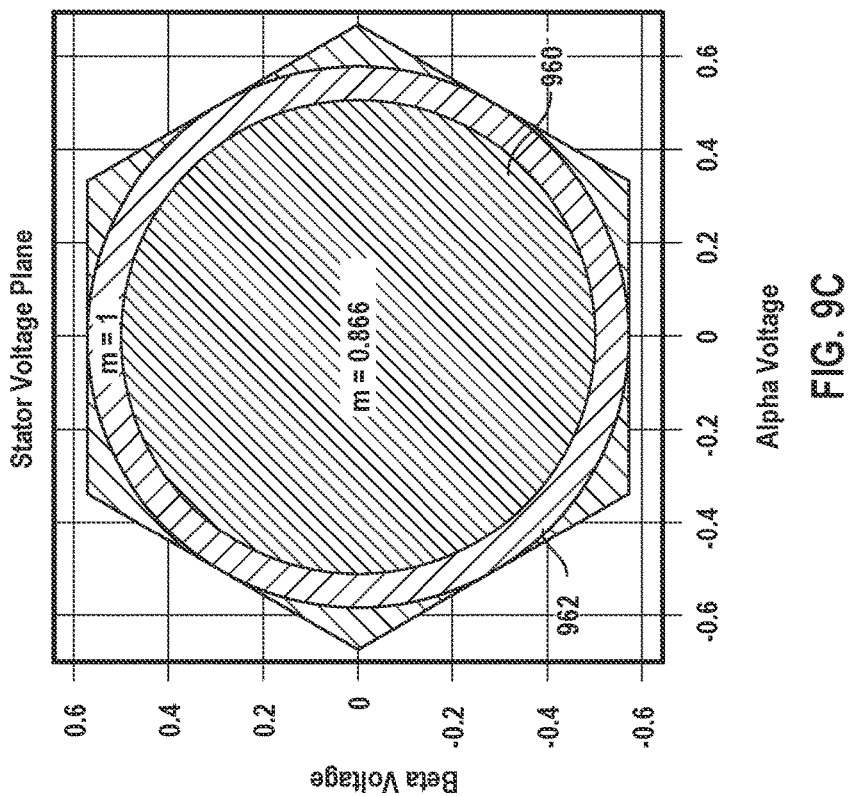
FIG. 9C is a conceptual graph illustrating an example of a stator voltage plane, in accordance with one or more techniques of this disclosure.
Figure 9A:
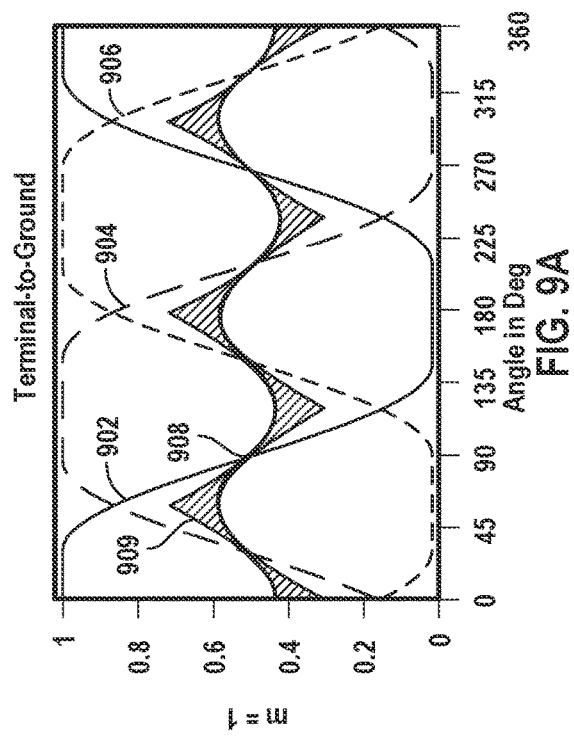
FIG. 9A is a conceptual graph illustrating a first example of a first switching signal within an area of possible star-to-ground voltage, in accordance with one or more techniques of this disclosure.

FIG. 9A is a conceptual graph illustrating a first example of a first switching signal 902 within an area 909 of possible star-to-ground voltages, in accordance with one or more techniques of this disclosure. The abscissa axis of FIG. 9A represents an electrical angle in degrees of motor 104 and the ordinate axis of FIG. 9A represents a first switching signal 902, a second switching signal 904, a third switching signal 906 for motor 104, an area 909 of possible star-to-ground voltages, and a star-to-ground voltages 908 in accordance with techniques described herein. FIG. 9A is described with FIGS. 1, 2, 3A, 3B, 4, 5, and 6A, 6B, 6C, 7, and 8 for example purposes only. The example of FIG. 9A is for a modulation of 1 (e.g., a 100% duty cycle).

Figure 9B:
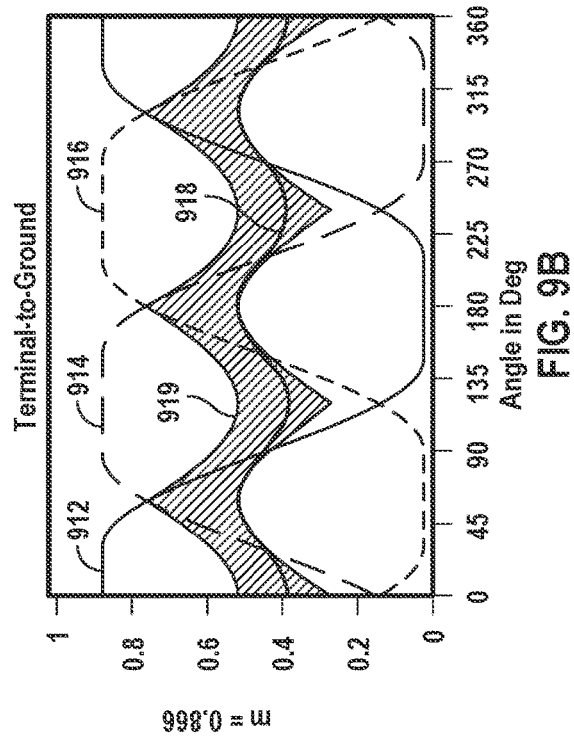
FIG. 9B is a conceptual graph illustrating a second example of a first switching signal within an area of possible star-to-ground voltage, in accordance with one or more techniques of this disclosure.

FIG. 9B is a conceptual graph illustrating a second example of a first switching signal 912 within an area 919 of possible star-to-ground voltage, in accordance with one or more techniques of this disclosure. The abscissa axis of FIG. 9B represents an electrical angle in degrees of motor 104 and the ordinate axis of FIG. 9B represents a first switching signal 912, a second switching signal 914, a third switching signal 916 for motor 104, an area 919 of possible star-to-ground voltages, and a star-to-ground voltages 918 in accordance with techniques described herein. FIG. 9B is described with FIGS. 1, 2, 3A, 3B, 4, 5, and 6A, 6B, 6C, 7, and 8 for example purposes only. The example of FIG. 9B is for a modulation of 0.86 (e.g., an 86% duty cycle).

FIG. 9C is a conceptual graph illustrating an example of a stator voltage plane, in accordance with one or more techniques of this disclosure. The abscissa axis of FIG. 9C represents an alpha voltage of motor 104 and the ordinate axis of FIG. 9C represents a beta voltage of motor 104 for a first modulation 962 of 1 (e.g., a 100% duty cycle) and a second modulation 960 of 0.86 (e.g., an 86% duty cycle). FIG. 9C is described with FIGS. 1, 2, 3A, 3B, 4, 5, and 6A, 6B, 6C, 7, and 8 for example purposes only.

FIGS. 9A-9C demonstrate how techniques described herein may configure control circuitry 120 to generate first switching signal 902, second switching signal 904, and third switching signal 906 to control star-to-ground voltage 908 to be at an edge of area 909 of possible star-to-ground voltages, which may provide a reduction of the switching occurrences by ⅙ (e.g., less switching losses) compared to techniques that do not position star-to-ground voltage 908 to be at an edge of area 909. Moreover, techniques described herein may configure control circuitry 120 to generate first switching signal 902, second switching signal 904, and third switching signal 906 to control the star-to-ground voltage 908 to be a smooth (e.g., cosine), which may improve EMC due to the smoothness/continuity of the applied terminal-to-ground voltages compared to techniques that do use a non-sinusoidal star-to-ground voltage 908.

In the modulated (e.g., a duty cycle of less than 100%) example of FIG. 9B, techniques described herein may configure control circuitry 120 to generate first switching signal 912, second switching signal 914, and third switching signal 916 to control the star-to-ground voltage 918 to be at an edge of area 919 of possible star-to-ground voltages, which may provide a reduction of the switching occurrences by ⅙ (e.g., less switching losses) compared to techniques that do not position star-to-ground voltage 918 to be at an edge of area 919. Similarly, techniques described herein may configure control circuitry 120 to generate first switching signal 912, second switching signal 914, and third switching signal 916 to control the star-to-ground voltage 918 to be a smooth (e.g., cosine), which may improve EMC due to the smoothness/continuity of the applied terminal-to-ground voltages compared to techniques that do use a non-sinusoidal star-to-ground voltage 918.

Figure 10:
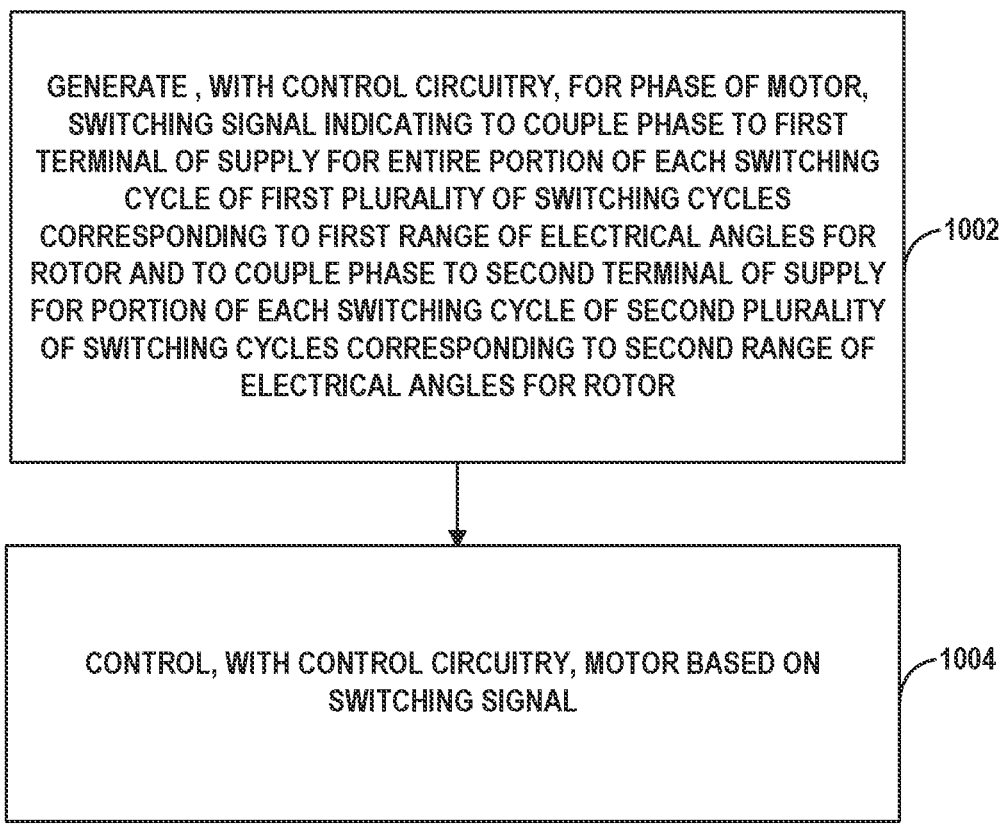
FIG. 10 is a flow diagram consistent with techniques that may be performed by the example system of FIG. 1, in accordance with this disclosure.

FIG. 10 is a flow diagram consistent with techniques that may be performed by the example system of FIG. 1, in accordance with this disclosure. FIG. 10 is described with FIGS. 1, 2, 3A, 3B, 4, 5, 6A, 6B, 6C, 7, 9A, 9B, and 9C for example purposes only.

In accordance with the techniques of the disclosure, control circuitry 120 may generate, for a phase of motor 104, a switching signal indicating to couple the phase to first terminal 130 of supply 124 for an entire portion of each switching cycle of a first plurality of switching cycles corresponding to a first range of electrical angles for the rotor and to couple the phase to a second terminal of the supply for a portion of each switching cycle of a second plurality of switching cycles corresponding to a second range of electrical angles for the rotor (1002). First terminal 130 of supply 124 may be a positive terminal and second terminal 132 of supply 124 may be a negative terminal (e.g., a reference voltage). In some examples, first terminal 130 of supply 124 may be a negative terminal (e.g., a reference voltage) and second terminal 132 of supply 124 may be a positive terminal.

For example, control circuitry 120 may generate first switching signal 612 of FIG. 6B to indicate to couple phase U of motor 104 to first terminal 130 (e.g., a reference voltage) of supply 124 for an entire portion of each switching cycle of a first plurality of switching cycles corresponding to a first range of electrical angles for the rotor (e.g., −150°-210°). In the example shown in FIG. 6B, first switching signal 612 indicates to couple phase U of motor 104 to second terminal 132 (e.g., an input circuit voltage) of supply 124 for a portion (e.g., corresponding to a duty cycle of 86%) of each switching cycle of a second plurality of switching cycles corresponding to a second range of electrical angles for the rotor (e.g., −30°-30°).

In some examples, the first range of electrical angles may comprise 60° and the second range of electrical angles may comprise 60°. For example, the first range of electrical angles for the rotor may comprise −30° to 30° and the second range of electrical angles for the rotor may comprise 150° to 210°. In some examples, the first range of electrical angles for the rotor may comprise 150° to 210° and the second range of electrical angles for the rotor may comprise −30° to 30°.

Control circuitry 120 may generate the switching signal to control driver circuitry 122 to modulate a duty cycle for coupling the phase to first terminal 130 of supply 124 for a third plurality of switching cycles corresponding to a third range of electrical angles for the rotor such that a voltage at the phase matches a first set of cosine functions during the third range of electrical angles for the rotor. In this example, control circuitry 120 may generate the switching signal to control driver circuitry 122 to modulate a duty cycle for coupling the phase to second terminal 132 of supply 124 for a fourth plurality of switching cycles corresponding to a fourth range of electrical angles for the rotor such that a voltage at the phase matches a second set of cosine functions during the fourth range of electrical angles for the rotor. The first set of cosine functions may comprise $M*\cos(\phi-30°)$ for an electrical angle for the rotor within 30° to 90° and $M*(1+\cos(\phi+30°))$ for the electrical angle for the rotor within 90° to 150°. M may be a voltage between first terminal 130 and second terminal 132 and may be the electrical angle for the rotor. The second set of cosine functions may comprise $M*(1+\cos(\phi-30°))$ for the electrical angle for the rotor within 210° to 270° and $M*\cos(\phi+30°)$ for the electrical angle for the rotor within 270° to 330°.

The switching signal may comprise a first pulse-width modulated (PWM) signal indicating, for each switching cycle of the first plurality of switching cycles, a fully switched duty cycle of two fully switched duty cycles and indicating, for each cycle of the second plurality of switching cycles, a duty cycle greater than 0% and less than 100%. The two fully switched duty cycles may comprise 0% and 100%. For example, the first PWM signal may indicate a duty cycle of 0% (see FIG. 6B). In some examples, the first PWM signal may indicate a duty cycle of 100% (see FIG. 6C). Control circuitry 120 may be configured to modify the duty cycle based on a control voltage amplitude. For example, control circuitry 120 may increase the duty cycle to increase a rotational speed of the rotor of motor 104 and may decrease the duty cycle to decrease the rotational speed of the rotor of motor 104.

Control circuitry 120 may control motor 104 based on the switching signal (1004). For example, control circuitry 120 may control motor 104 to continuously couple the phase to first terminal 130 for the entire first range of electrical angles (e.g., 150°-210°). For example, control circuitry 120 may be configured to control a half-bridge for the phase based on the switching signal. Control circuitry 120 may be configured to control a two-level inverter for the phase based on the switching signal. For example, control circuitry 120 may be configured to output the switching signal to driver circuitry 122. Driver circuitry 122 (which may comprise a half-bridge and/or a two-level inverter) may be configured to drive motor 104 based on the switching signal. In some examples, motor circuitry 102 may comprise control circuitry 120 and driver circuitry 122. However, in other examples, control circuitry 120 and driver circuitry 122 may be separate (e.g., implemented on different integrated circuits).

While the foregoing examples are directed to a first switching signal, techniques may be applied to a plurality of switching signals for controlling motor 104. For example, control circuitry 120 may be configured to generate, for a second phase of motor 104, a second switching signal that is offset from the switching signal by 120°. Similarly, control circuitry 120 may be configured to generate, for a third phase of motor 104, a third switching signal that is offset from the switching signal by 240°.

The following examples may illustrate one or more aspects of the disclosure.

Clause 1: A circuit for controlling a motor, the circuit comprising control circuitry configured to: generate, for a phase of the motor, a switching signal indicating to couple the phase to a first terminal of a supply for an entire portion of each switching cycle of a first plurality of switching cycles corresponding to a first range of electrical angles for the rotor and to couple the phase to a second terminal of the supply for a portion of each switching cycle of a second plurality of switching cycles corresponding to a second range of electrical angles for the rotor; and control the motor based on the switching signal.

Clause 2: The circuit of clause 1, wherein the switching signal is configured to control driver circuitry to continuously couple the phase to the first terminal for the entire first range of electrical angles.

Clause 3: The circuit of clauses 1-2, wherein the first range of electrical angles for the rotor comprises −30° to 30° and the second range of electrical angles for the rotor comprises 150° to 210° or the first range of electrical angles for the rotor comprises 150° to 210° and the second range of electrical angles for the rotor comprises −30° to 30°.

Clause 4: The circuit of clauses 1-3, wherein the control circuitry is configured to initiate a timer in response to the generation of the control signal for controlling the motor based on the first angle of stator voltage for the motor associated with the first sector; and wherein, to determine that the commutation event has occurred for the first sector, the control circuitry is configured to determine the timer has exceeded a predetermined threshold time.

Clause 5: The circuit of clauses 1-4, wherein the switching signal is configured to control driver circuitry to modulate a duty cycle for coupling the phase to the first terminal of the supply for a third plurality of switching cycles corresponding to a third range of electrical angles for the rotor such that a voltage at the phase matches a first set of cosine functions during the third range of electrical angles for the rotor; and wherein the switching signal is configured to control the driver circuitry to modulate a duty cycle for coupling the phase to the second terminal of the supply for a fourth plurality of switching cycles corresponding to a fourth range of electrical angles for the rotor such that a voltage at the phase matches a second set of cosine functions during the fourth range of electrical angles for the rotor.

Clause 6: The circuit of clause 5, wherein the first set of cosine functions comprises $M*\cos(\phi-30°)$ for an electrical angle for the rotor within 30° to 90° and $M*(1+\cos(\phi+30°))$ for the electrical angle for the rotor within 90° to 150°, wherein M is a voltage between the first terminal and the second terminal, $\phi$ is the electrical angle for the rotor; and wherein the second set of cosine functions comprises $M*(1+\cos(\phi-30°))$ for the electrical angle for the rotor within 210° to 270° and $M*\cos(\phi+30°)$ for the electrical angle for the rotor within 270° to 330°.

Clause 7: The circuit of clauses 1-6, wherein the switching signal comprises a first pulse-width modulated signal indicating, for each switching cycle of the first plurality of switching cycles, a fully switched duty cycle of two fully switched duty cycles and indicating, for each cycle of the second plurality of switching cycles, a duty cycle greater than 0% and less than 100%, wherein the two fully switched duty cycles comprise 0% and 100%.

Clause 8: The circuit of clause 7, wherein the control circuitry is configured to modify the duty cycle based on a control voltage amplitude.

Clause 9: The circuit of clauses 1-8, wherein the first terminal of the supply is a positive terminal and the second terminal of the supply is a negative terminal.

Clause 10: The circuit of clauses 1-8, wherein the first terminal of the supply is a negative terminal and the second terminal of the supply is a positive terminal.

Clause 11: The circuit of clauses 1-10, wherein the switching signal is a first switching signal and wherein the phase is a first phase and wherein the control circuitry is configured to generate, for a second phase of the motor, a second switching signal that is offset from the first switching signal by 120°.

Clause 12: The circuit of clauses 1-11, wherein, to control the motor based on the switching signal, the control circuitry is configured to control a half-bridge for the phase based on the switching signal.

Clause 13: The circuit of clauses 1-12, wherein, to control the motor based on the switching signal, the control circuitry is configured to control a two-level inverter for the phase based on the switching signal.

Clause 14: The circuit of clauses 1-13, wherein, to control the motor, the control circuitry is configured to output the switching signal to driver circuitry and wherein the driver circuitry is configured to drive the motor based on the switching signal.

Clause 15: The circuit of clause 14, wherein the circuit further comprises the driver circuitry.

Clause 16: A method comprising: generating, with control circuitry, for a phase of the motor, a switching signal indicating to couple the phase to a first terminal of a supply for an entire portion of each switching cycle of a first plurality of switching cycles corresponding to a first range of electrical angles for the rotor and to couple the phase to a second terminal of the supply for a portion of each switching cycle of a second plurality of switching cycles corresponding to a second range of electrical angles for the rotor; and controlling, with the control circuitry, the motor based on the switching signal.

Clause 17: The method of clause 16, wherein the switching signal is configured to control driver circuitry to continuously couple the phase to the first terminal for the entire first range of electrical angles.

Clause 18: The method of clauses 16-17, wherein the first range of electrical angles comprises 60° and wherein the second range of electrical angles comprises 60°.

Clause 19: The method of clauses 16-18, wherein the first range of electrical angles for the rotor comprises −30° to 30° and the second range of electrical angles for the rotor comprises 150° to 210° or the first range of electrical angles for the rotor comprises 150° to 210° and the second range of electrical angles for the rotor comprises −30° to 30°.

Clause 20: The method of clauses 16-19, wherein the switching signal is configured to control driver circuitry to modulate a duty cycle for coupling the phase to the first terminal of the supply for a third plurality of switching cycles corresponding to a third range of electrical angles for the rotor such that a voltage at the phase matches a first set of cosine functions during the third range of electrical angles for the rotor; and wherein the switching signal is configured to control the driver circuitry to modulate a duty cycle for coupling the phase to the second terminal of the supply for a fourth plurality of switching cycles corresponding to a fourth range of electrical angles for the rotor such that a voltage at the phase matches a second set of cosine functions during the fourth range of electrical angles for the rotor.

Clause 21: The method of clauses 16-20, wherein the first set of cosine functions comprises $M*\cos(\phi-30°)$ for an electrical angle for the rotor within 30° to 90° and $M*(1+\cos(\phi+30°))$ for the electrical angle for the rotor within 90° to 150°, wherein M is a voltage between the first terminal and the second terminal, is the electrical angle for the rotor, and wherein the second set of cosine functions comprises $M*(1+\cos(\phi-30°))$ for the electrical angle for the rotor within 210° to 270° and $M*\cos(\phi+30°)$ for the electrical angle for the rotor within 270° to 330°

Clause 22: The method of clauses 16-21, wherein the switching signal comprises a first pulse-width modulated signal indicating, for each switching cycle of the first plurality of switching cycles, a fully switched duty cycle of two fully switched duty cycles and indicating, for each cycle of the second plurality of switching cycles, a duty cycle greater than 0% and less than 100%, wherein the two fully switched duty cycles comprise 0% and 100%.

Clause 23: The method of clause 22, further comprising modifying, with the control circuitry, the duty cycle based on a control voltage amplitude.

Clause 24: The method of clauses 16-23, wherein the first terminal of the supply is a positive terminal and the second terminal of the supply is a negative terminal.

Clause 25: The method of clauses 16-23, wherein the first terminal of the supply is a negative terminal and the second terminal of the supply is a positive terminal.

Clause 26: The method of clauses 16-25, wherein the switching signal is a first switching signal and wherein the phase is a first phase, the method further comprising generating, with the control circuitry, for a second phase of the motor, a second switching signal that is offset from the first switching signal by 120°.

Clause 27: The method of clauses 16-26, wherein controlling the motor based on the switching signal comprises controlling a half-bridge for the phase based on the switching signal.

Clause 28: The method of clauses 16-27, wherein controlling the motor based on the switching signal comprises controlling a two-level inverter for the phase based on the switching signal.

Clause 29: The method of clauses 16-28, wherein controlling the motor comprises outputting the switching signal to driver circuitry and wherein the driver circuitry is configured to drive the motor based on the switching signal.

Clause 30: A system comprising: a motor, driver circuitry configured to drive the motor based on a switching signal; and control circuitry configured to: generate, for a phase of the motor, the switching signal to indicate to couple the phase to a first terminal of a supply for an entire portion of each switching cycle of a first plurality of switching cycles corresponding to a first range of electrical angles for the rotor and to couple the phase to a second terminal of the supply for a portion of each switching cycle of a second plurality of switching cycles corresponding to a second range of electrical angles for the rotor; and output the switching signal.

Various aspects have been described in this disclosure. These and other aspects are within the scope of the following claims.

What is claimed is:

1. A circuit for controlling a motor, the circuit comprising:
   driver circuitry configured to drive the motor based on a switching signal; and
   control circuitry comprising one or more processors configured to:
      generate, for a phase of the motor, a switching signal indicating to couple the phase to a first terminal of a supply for an entire portion of each switching cycle of a first plurality of switching cycles corresponding to a first range of electrical angles for the rotor and to couple the phase to a second terminal of the supply for a portion of each switching cycle of a second plurality of switching cycles corresponding to a second range of electrical angles for the rotor; and
      output, to the driver circuitry, the switching signal, wherein the driver circuitry is configured to control the motor based on the switching signal.

2. The circuit of claim 1, wherein the switching signal is configured to control the driver circuitry to continuously couple the phase to the first terminal for the entire first range of electrical angles.

3. The circuit of claim 1, wherein the first range of electrical angles comprises 60° and wherein the second range of electrical angles comprises 60°.

4. The circuit of claim 1, wherein the first range of electrical angles for the rotor comprises −30° to 30° and the second range of electrical angles for the rotor comprises 150° to 210° or the first range of electrical angles for the rotor comprises 150° to 210° and the second range of electrical angles for the rotor comprises −30° to 30°.

5. The circuit of claim 1,
   wherein the switching signal is configured to control the driver circuitry to modulate a duty cycle for coupling the phase to the first terminal of the supply for a third plurality of switching cycles corresponding to a third range of electrical angles for the rotor such that a voltage at the phase matches a first set of cosine functions during the third range of electrical angles for the rotor; and
   wherein the switching signal is configured to control the driver circuitry to modulate a duty cycle for coupling the phase to the second terminal of the supply for a fourth plurality of switching cycles corresponding to a fourth range of electrical angles for the rotor such that a voltage at the phase matches a second set of cosine functions during the fourth range of electrical angles for the rotor.

6. The circuit of claim 5,
wherein the first set of cosine functions comprises M*cos(φ−30°) for an electrical angle for the rotor within 30° to 90° and M*(1+cos(φ+30°)) for the electrical angle for the rotor within 90° to 150°, wherein M is a voltage between the first terminal and the second terminal, φ is the electrical angle for the rotor; and
wherein the second set of cosine functions comprises M*(1+cos(φ−30°)) for the electrical angle for the rotor within 210° to 270° and M*cos(φ+30°) for the electrical angle for the rotor within 270° to 330°.

7. The circuit of claim 1, wherein the switching signal comprises a first pulse-width modulated signal indicating, for each switching cycle of the first plurality of switching cycles, a fully switched duty cycle of two fully switched duty cycles and indicating, for each cycle of the second plurality of switching cycles, a duty cycle greater than 0% and less than 100%, wherein the two fully switched duty cycles comprise 0% and 100%.

8. The circuit of claim 7, wherein the one or more processors are configured to modify the duty cycle based on a control voltage amplitude.

9. The circuit of claim 1, wherein the first terminal of the supply is a positive terminal and the second terminal of the supply is a negative terminal.

10. The circuit of claim 1, wherein the first terminal of the supply is a negative terminal and the second terminal of the supply is a positive terminal.

11. The circuit of claim 1, wherein the switching signal is a first switching signal and wherein the phase is a first phase and wherein the one or more processors are configured to generate, for a second phase of the motor, a second switching signal that is offset from the first switching signal by 120°.

12. The circuit of claim 1, wherein, to control the motor based on the switching signal, the one or more processors are configured to control a half-bridge for the phase based on the switching signal.

13. The circuit of claim 1, wherein, to control the motor based on the switching signal, the one or more processors are configured to control a two-level inverter for the phase based on the switching signal.

14. A method comprising:
generating for a phase of the motor, a switching signal indicating to couple the phase to a first terminal of a supply for an entire portion of each switching cycle of a first plurality of switching cycles corresponding to a first range of electrical angles for the rotor and to couple the phase to a second terminal of the supply for a portion of each switching cycle of a second plurality of switching cycles corresponding to a second range of electrical angles for the rotor; and
controlling the motor based on the switching signal.

15. The method of claim 14, wherein the switching signal is configured to control driver circuitry to continuously couple the phase to the first terminal for the entire first range of electrical angles.

16. The method of claim 14, wherein the first range of electrical angles comprises 60° and wherein the second range of electrical angles comprises 60°.

17. The method of claim 14, wherein the first range of electrical angles for the rotor comprises −30° to 30° and the second range of electrical angles for the rotor comprises 150° to 210° or the first range of electrical angles for the rotor comprises 150° to 210° and the second range of electrical angles for the rotor comprises −30° to 30°.

18. The method of claim 14,
wherein the switching signal is configured to control driver circuitry to modulate a duty cycle for coupling the phase to the first terminal of the supply for a third plurality of switching cycles corresponding to a third range of electrical angles for the rotor such that a voltage at the phase matches a first set of cosine functions during the third range of electrical angles for the rotor; and
wherein the switching signal is configured to control the driver circuitry to modulate a duty cycle for coupling the phase to the second terminal of the supply for a fourth plurality of switching cycles corresponding to a fourth range of electrical angles for the rotor such that a voltage at the phase matches a second set of cosine functions during the fourth range of electrical angles for the rotor.

19. The method of claim 18,
wherein the first set of cosine functions comprises M*cos(φ−30°) for an electrical angle for the rotor within 30° to 90° and M*(1+cos(φ+30°)) for the electrical angle for the rotor within 90° to 150°, wherein M is a voltage between the first terminal and the second terminal, φ is the electrical angle for the rotor; and
wherein the second set of cosine functions comprises M*(1+cos(φ−30°)) for the electrical angle for the rotor within 210° to 270° and M*cos(φ+30°) for the electrical angle for the rotor within 270° to 330°.

20. A system comprising:
a motor;
driver circuitry configured to drive the motor based on a switching signal; and
control circuitry comprising one or more processors configured to:
generate, for a phase of the motor, the switching signal to indicate to couple the phase to a first terminal of a supply for an entire portion of each switching cycle of a first plurality of switching cycles corresponding to a first range of electrical angles for the rotor and to couple the phase to a second terminal of the supply for a portion of each switching cycle of a second plurality of switching cycles corresponding to a second range of electrical angles for the rotor; and
output, to the driver circuitry, the switching signal.

21. The system of claim 20, wherein the switching signal is configured to control the driver circuitry to continuously couple the phase to the first terminal for the entire first range of electrical angles.

* * * * *